United States Patent Office.

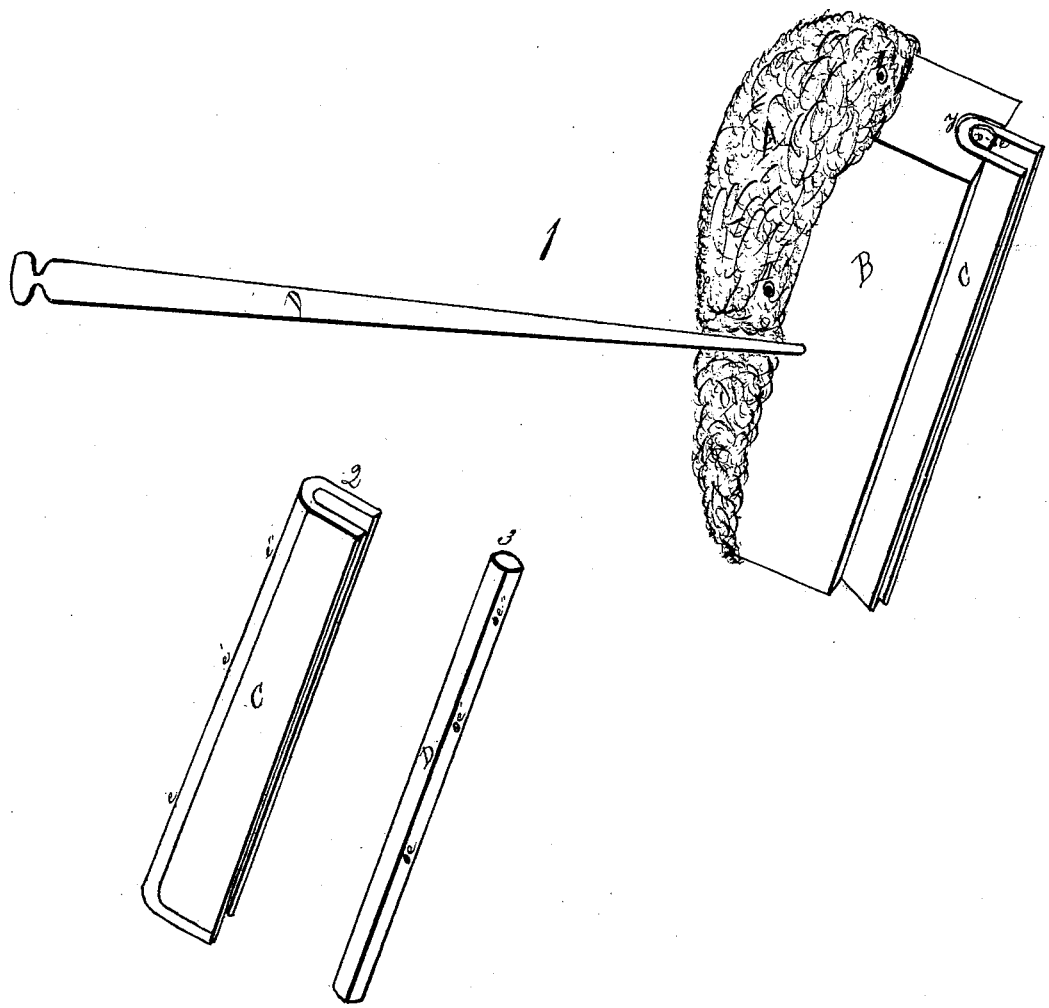

WILLIAM G. RHODEHAMEL, OF PIQUA, OHIO.

Letters Patent No. 104,886, dated June 28, 1870.

IMPROVED SCRUBBER AND CLEANER.

The Schedule referred to in these Letters Patent and making part of the same.

To all whom it may concern:

Be it known that I, WILLIAM G. RHODEHAMEL, of Piqua, in the county of Miami and State of Ohio, have invented a new and useful Scrubber and Cleaner, to be used in scrubbing and cleaning all kinds of surfaces of wood, glass, or anything; and I do hereby declare that the following is a full, clear, and exact description of the construction and operation of the same, reference being had to the annexed drawing making a part of this specification, in which—

Figure 1 is a perspective view;

Figure 2 represents the rubber portion of the scrubber and cleaner; and

Figure 3 represents the bar that fastens the rubber to the other part in groove $y$, fig. 1.

In fig. 1—

A represents a sponge, fastened to the wood part B by means of tacks, I I'.

B represents the wood part of the scrubber and cleaner.

$y$ is to represent the groove in the wood part B, for the rubber part $c$ (or fig. 2) to be placed in.

D (or fig. 3) represents the bar or fastener.

$e$ $e'$ $e''$ represent the screws or brads, which are used in fastening C (or fig. 2) in the groove $y$, as represented in fig. 1.

The rubber C is used for a scrubber, and can be used on all surfaces for scrubbing and cleaning.

A, in fig. 1, represents a sponge, which is to be used as a cleaner and absorber. It can be used on all surfaces, whether plain or uneven, and as an absorber on all uneven surfaces, to take up the water, &c., leaving the surface perfectly dry and clean.

What I claim, as my improvement on scrubber and cleaner, is—

The combination of the head B, the rubber $c$, sponge A, and handle D, as shown and described, for the purpose set forth.

WILLIAM G. RHODEHAMEL.

Witnesses:
W. H. RHODEHAMEL,
O. O. MATHERS.